3,259,601
BAKED METAL PRIMERS OF TERNARY BUTADIENE POLYMER AND PHOSPHORIC ACID
William L. Protzek, New Kensington, and Edward H. Gleason, Monroeville, Pa., assignors to Koppers Company, Inc., a corporation of Delaware
No Drawing. Filed July 31, 1963, Ser. No. 299,116
8 Claims. (Cl. 260—29.7)

This invention relates to the preparation of synthetic latices. In one specific aspect, it relates to a synthetic latex for baked metal primers having improved properties obtained by polymerizing the latex in the presence of ortho-phosphoric acid.

The practical applications of a vinyl aryl monomer-conjugated diolefin latex are limited because the polymer, having a high concentration of unsaturation, is highly susceptible to air oxidation which is further accelerated by the action of heat and light. Oxidation of the latex coating causes discoloration and loss of strength, flexibility and adhesion. Attempts to solve the problem by post-addition of antioxidants to the latex coatings have considerably improved the effect of aging, but the extent of stabilization, though adequate for some uses, could be greatly improved and in rigorous applications is totally inadequate. When the latex is used in baked metal primer formulations, the anti-corrosion pigments of the primer accelerate the ageing of the latex binder to the extent that the primer coating fails to pass the requirements of impact resistance and adhesion necessary for practical uses.

Quite surprisingly, we have discovered that the pre-addition of ortho-phosphoric acid to the latex formulation during emulsion polymerization has produced a later having numerous improved properties. The heat-ageing properties of our treated synthetic latex films were superior to untreated synthetic latex films in retention of impact strength, color, and adhesion. When the novel treated latex was used as a vehicle for a lead silico-chromate primer, and the primer was coated on a phosphatized steel panel, the primer showed superior adhesion and greater impact resistance when compared to a standard primer coating prepared from an untreated latex vehicle.

It is therefore an object of the present invention to provide a synthetic latex having improved heat-ageing properties.

It is another object of the present invention to provide a synthetic-latex base for baked industrial primers which imparts improved heat-ageing and corrosion resistance properties.

In accordance with the present invention, we have discovered a method of making a coating composition by copolymerizing 50–80 parts of a vinyl aryl monomer, 20–50 parts of an aliphatic conjugated diolefin, and 0.5–4.0 parts of an unsaturated acid by emulsion polymerization in an aqueous medium, said polymerization being carried out in the presence of 0.5–6.0 parts of ortho-phosphoric acid.

The vinyl aryl monomers useful in the present invention are styrene, o-methylstyrene, m-methylstyrene, p-methylstyrene, ethylstyrene, dimethylstyrene, alpha - methylstyrene, p-methoxystyrene, p-chlorostyrene, 2,4-dichlorostyrene, 2,5-dichlorostyrene, p-bromostyrene, alpha-methyl-p-methylstyrene, p-isopropylstyrene, vinyl naphthalene, acenaphthalene, and the like. Mixtures of two or more such compounds may be used if desired.

Suitable conjugated diolefins include butadiene-1,3, 2-methylbutadiene-1,3 (isoprene), 2-chlorobutadiene-1,3 (chloroprene), piperylene, and 2,3-dimethylbutadiene-1,3.

Suitable unsaturated acids include acrylic acid and its homologues, such as methacrylic acid and ethacrylic acid. Unsaturated dicarboxylic acids such as itaconic acid and their mono-esters are particularly suitable. Other useful unsaturated acids include maleic acid, fumaric acid, cinnamic, aconitic, and citraconic.

The latex of the present invention is produced by interpolymerizing the foregoing components within a specific range of proportions. In giving proportions, the parts by weight of total monomers is defined to include only major comonomers, i.e., the vinyl aryl monomer and conjugated diolefin. The vinyl aryl monomer content should comprise 50–80 parts by weight of the total monomers in which the range between 60–70 parts is preferred. The conjugated diolefin components should comprise from 20–50 parts by weight of the total monomers in which the preferred range is from 30–40 parts. The unsaturated acid content should be added in amounts of 0.25–4.0 parts by weight of the total monomers, the preferred amount being about 2.0 parts. Using less than a minimum amount of unsaturated acid results in the formation of a latex having unsatisfactory mechanical stability as determined by the formation of coagulation during mixing, or other mechanical agitation. On the other hand, using more than the maximum amount of unsaturated acid results in decrease conversion of the latex to below the acceptable range of 96–100 percent based on the monomers charged.

The novel latex is prepared in the presence of ortho-phosphoric acid which may be added in the acid form or formed in situ from the phosphate salts, e.g., sodium phosphate, potassium phosphate, and ammonium phosphate. Addition of the acid is preferred, since the addition of salts increases the amount of electrolyte present which correspondingly decreases the rate of polymerization. The amount of phosphoric acid required ranges from 0.5–6.0 parts by weight of the total monomers with an optimum amount of 2–4 parts by weight. Decreasing the amount of phosphoric acid causes the film to become brittle and lose adhesion to the substrate whereas increasing the amount of phosphoric acid increases the water sensitivity resulting in increased water being able to penetrate the film and cause corrosion.

The polymerization of the monomers may be carried out by conventional aqueous emulsion polymerization reactions. Preferably, the monomers are premixed, the catalyst is premixed to form an aqueous solution or slurry and then these two premixes are added to a charge of water in the reaction vessel. The monomer premix is generally formed by mixing together the monomer components: vinyl aryl monomer, conjugated diolefin and unsaturated acid. When the unsaturated acid is water soluble, e.g., itaconic acid, the acid is premixed with the water phase.

The catalyst premix is comprised of water, catalyst, emulsifying agents and dispersing agents. Any of the conventional polymerization catalysts may be used such, for example, as potassium persulfate, benzoyl peroxide, lauroyl peroxide, di-tert-butyl peroxide, cumene hydroperoxide, azobisisobutyronitrile, etc. Mixtures of two or more such polymerization catalysts may be used if desired. The amount of catalyst to be used is conventional and generally falls within the range of 0.01 to 1.0 part of polymerization catalyst per 100 parts of total monomers.

Any of the conventional alkaline or neutral emulsifying agents may be used alone or in their admixtures, such as, alkali metal salts of long chain alkyl sulfates and sulfonates, ethylene oxide condensates of long chain fatty acids, alcohols or mercaptans, sodium salts of sulfonated hydrocarbons, alkyl aryl sulfonates, etc. Representative emulsifying agents include compounds such as sodium lauryl sulfate, sulfosuccinic acid esters, the 3-ethylhexyl ester of sulfosuccinic acid, sodium salts of dioctyl sulfosuccinic acid, sodium salts of sulfated cetyl alcohol, sodium pyrophosphate and alkyl aryl polyether alcohol.

The amount of water to be used in carrying out the emulsion polymerization may vary within wide limits. It is generally preferable to use sufficient water such that the latex will have a solids content of 30–55 percent. The amount of water, of course, may be increased or decreased to provide a latex having a higher or lower solids content.

The polymerization is carried out at a pH within the acid range, preferably in the range of 1.5 to 3.2. After the latex has been prepared, it is desirable to raise the pH to 8–10. The pH may be adjusted with inorganic or organic bases, such as sodium hydroxide, ammonium hydroxide, potassium hydroxide, monoethanolamine, and the like.

Our invention is further illustrated by the following examples.

*Example I*

A pre-addition ortho-phosphoric acid latex was prepared according to the following formulation.

| Formulation: | Parts by weight |
| --- | --- |
| Styrene | 60 |
| Butadiene | 40 |
| Itaconic acid | 2.0 |
| Ortho-phosphoric acid | 2.0 |
| Surfactant | 2.45 |
| Dispersant | 0.045 |
| Potassium persulfate | 0.3 |
| Potassium chloride | 0.05 |
| Water | 80 |

A five-gallon reactor equipped with an agitator was charged with 80 parts water, 2.0 parts itaconic acid, 2.0 parts ortho-phosphoric acid, 2.45 parts surfactants, 0.045 part dispersant, 0.05 part potassium chloride and 0.3 part potassium persulfate. While maintaining room temperature, the reactor was flushed with nitrogen and sealed. Agitation was begun and continued for sufficient time to ensure solution of all ingredients. A mixture of 100 parts monomers, 60 parts styrene and 40 parts butadiene was admitted to the reactor. Upon completion of monomer addition and with continued agitation the reactor was heated from room temperature to 75° C. in about one hour. A temperature of 75° C. was held for 8 to 10 hours during which time conversion of monomers to polymer exceeded 96 percent.

Typical latex properties are as follows for the stripped latex:

| | |
| --- | --- |
| Solids, percent | 52 |
| pH | 9.5 |
| Viscosity, cps. | 125 |
| Surface tension, dynes/cm. | 39 |
| Mechanical stability, minutes | >20 |
| Calcium carbonate stability | Good |

*Example II*

For purposes of comparison of primer properties, Gray primer samples were prepared by admixture of pigment paste with (a) the pre-addition ortho-phosphoric acid latex prepared in Example I and (b) a standard commercial latex (styrene 60 parts, butadiene 40 parts, acrylic acid 1.0 part sold under the trademark Dylex K–33).

The pigment paste was prepared by mixing the following ingredients and passing the mixture through a Morehouse mill to obtain adequate dispersion of pigments:

| Paste: | Parts by weight |
| --- | --- |
| Titanium dioxide | 340 |
| Barium sulfate | 448 |
| Potassium aluminum silicate | 788 |
| Carbon black | 8.8 |
| Emulsifier | 8.0 |
| Dispersant | 7.5 |
| Water | 1088 |
| | 2688 |

To prepare the primer from the paste, neutralized latex of approximately 45 percent solids and paste were mixed in the ratio of 20 to 30 parts by weight. This prepared a primer with an approximate 45 percent pigment volume concentration.

When the pre-addition ortho-phosphoric acid latex was formulated into the primer and cast as a 3 mil wet film on a phosphatized steel panel, the heat-aging characteristics were far superior to a coating similarly prepared with the commercial latex. This was based on the results of Gardner Impact tests on coated panels after heating at 177° C. for extended periods of time as follows:

(1) A primer coating made with the commercial latex and baked for 20 minutes at 177° C. showed both brittleness and loss of adhesion above 48 in. lbs. reverse impact. Below 48 in. lbs., adhesion was satisfactory but brittleness occurred to very low impacts. Brittleness was apparent even at 80 in. lbs. face impact.

(2) The results of the standard commercial latex containing primer were compared to the pre-addition phosphoric acid latex containing primer. A phosphatized steel panel was coated with the primer containing the treated latex. After an initial bake at 177° C. for 20 minutes, the coating passed a 112 in. lbs. reverse impact without signs of brittleness or loss of adhesion. The coating was then tested for impact resistance after heating at 177° C. for additional 30 minute intervals. After 50 minutes, the coating still retained adhesion on 112 in. lbs. reverse impact, but was brittle, and the coating still completely passed 80 in. lbs. face impact. Again after 80 minutes the coating completely passed 80 in. lbs. face impact. Finally after 110 minutes at 177° C. the coating was brittle and lost adhesion after 80 in. lbs. face impact. At this time the impact resistance had exhibited about the same resistance as the commercial latex primer had after only 20 minutes. The difference between 20 minutes and 110 minutes at the temperature of 177° C. is the equivalent of many days at lower temperatures, i.e., 10 days ageing at 70° C. is nearly equivalent to this difference.

*Example III*

For purposes of comparison of the effect of our latex and a standard latex on the properties of an anticorrosion primer formulation, samples were prepared by admixture of an industrial primer pigment paste with (a) the pre-addition ortho-phosphoric acid latex prepared in Example I and (b) the standard commercial latex used in Example II. The primers were prepared as set forth in Example II using the following paste formulation.

| Paste: | Parts by weight |
| --- | --- |
| Calcium molybdate | 104.0 |
| Iron oxide | 100.0 |
| Barium sulfate | 160.0 |
| Clay | 146.0 |
| Thickener | 4.0 |
| Water soluble resin (Arolon 304) | 328.0 |
| Dispersant | 12.0 |
| Non-ionic emulsifier | 6.0 |
| Water | 206.0 |
| Cobalt drier | 3.6 |
| Manganese drier | 3.6 |

| Primer: | |
| --- | --- |
| Paste | 30.0 |
| Latex (about 45 percent solids) | 27.0 |

The results obtained were similar to Example II.

(1) The primer coating, made with the commercial latex, was cast on a 3 mil wet film on a phosphatized steel panel and baked for 20 minutes at 177° C. showed both brittleness and loss of adhesion above 48 in. lbs. reverse impact.

(2) The primer coating, made with the pre-added ortho-phosphoric acid latex was cast as a 3 mil wet film on a phosphatized steel panel and baked at 177° C.

The coating showed no brittleness or loss of adhesion at an impact of 80 in. lbs. until after being baked for 110 minutes at 177° C.

TABLE II

| Total Minutes Heated at 177° C. | Type Latex | |
|---|---|---|
| | Phosphoric Acid | No Phosphoric Acid |
| Latex Films: | | |
| 20 | Passes 112 in. lb. reverse impact | Passes 112 in. lb. reverse impact. |
| 50 | ____do____ | Fails 20 in. lb. face impact due to brittleness. |
| 80–300 | Passes 112 in. lb. reverse impact, testing discontinued. | Testing discontinued. |
| Gray Primer: | | |
| 20 | Passes 112 in. lb. reverse impact | Fails 112 in. lb. reverse impact due to brittleness and loss of adhesion. Fails 40 in. lb. face impact due to brittleness. |
| 50 | Fails 112 in. lbs. reverse impact due to brittleness but passes 80 in. lb. face impact. | Discontinued Testing. |
| 80 | Passes 80 in. lb. face impact. | |
| 110 | Fails 80 in. lb. face impact due to brittleness and loss of adhesion. | |

Example IV

Following the procedure and the formulation of Example I, substitutions of acid monomers were made to determine the effect on the latex film and on the primer.

Comparison of the effect of acid monomers is shown in the table below.

TABLE I

| Acid Content of Latex | Heat-Ageing of Latex and Primer on Bonderite 100 Panels at 177° C. | |
|---|---|---|
| | Latex Films | Primer Coats |
| Itaconic, 2 parts | Passes 112 in. lb. reverse impact after 300 min. | Passes 112 in. lb. reverse impact after 20 min. Passes 80 in. lb. face impact after 50 and 80 min. Fails 80 in. lb. face after 110 min. |
| Itaconic/acrylic, 1/1.5 parts | Passes 112 in. lb. reverse impact after 200 min. | Passes 112 in. lb. reverse impact after 20 and 50 min. Fails 80 in. lb. face after 80 min. |
| Fumaric, 2 parts | Passes 112 in. lbs. reverse impact after 300 min. | (Passes 80 in. lbs. face impact after 9 days at 70° C.) |

It may thus be concluded that itaconic acid gave the best polymer properties, but acrylic and fumaric could also be used. Displacement of itaconic acid with some acrylic acid tended to increase the brittleness and therefore reduced impact resistance as shown in the table above. Fumaric acid containing films were almost comparable to itaconic acid containing films.

Thus it may be concluded that the impact resistance of the latex films and the primer coatings of the phosphoric acid-free latex was very poor as compared to the latex films and the primer coatings of phosphoric acid-containing latex.

Example VI

The latex prepared in Example I was compared with a latex having the same formulation and prepared in the same manner except that the orthophosphoric acid was added after polymerization. The properties of each latex are shown below:

TABLE III

| | Phosphoric Acid-Containing Latex | |
|---|---|---|
| | Pre-Added | Post-Added |
| Mechanical Stability at pH 1.5 minutes to failure.[1] | 20 | 15, thickened. |
| Latex, acid-side viscosity, cps | 125 | 696. |
| Primer adhesion 20 min. at 177° C | Passed 112 in. lb. reverse impact | Failed 112 in. lb. reverse impact. |
| Humidity and Water Exposure, 50° C. of Primer. | No blistering up to 196 hours | Blistering after 64 hours. |
| Kettle Coating | Absence of coating | Coating of about ⅛ in. thickness on kettle walls. |

[1] Hamilton-Beach Mixer.

Example V

Two styrene/butadiene latices, identical in monomer composition, differing in that one containing two parts phosphoric acid and the other containing no phosphoric acid, were neutralized with ammonium hydroxide to a pH of 9.0, then cast as 3 mil wet films on Bonderite 100 panels. After air drying 20 minutes the panels were baked at 177° C. for 20 minutes. The latex films were then examined for impact resistance using the Gardner Impact test.

The above two latices were incorporated into the Gray primer (Example II) and coatings on metal panels were prepared as for the later films. The impact results for latex films and primer coatings are shown in the following table:

The pre-addition of phosphoric acid to latex shows a number of advantages over the post-addition of phosphoric acid after polymerization. Some of the advantages are beneficial to the polymerization process and others are found in the performance of the latex. These advantages are—

(1) Improved mechanical stability of the latex (particularly at low pH) at low surfactant concentrations.

(2) The polymerization kettle contains very little coating, much less than usually encountered in styrene/butadiene latex preparation.

(3) For latices made at similar rates, the ortho-phosphoric acid reduces latex viscosity.

(4) The pre-addition phosphoric acid latex had better adhesion of primer to metal substrate after baking.

(5) The pre-addition phosphoric acid latex had much better resistance of the primer to blistering in wet or humid environment and freedom from bleaching of the film where exposed to water.

We claim:

1. A method of making a coating composition comprising copolymerizing 50–80 parts of a vinyl aryl monomer, 50–20 parts of an aliphatic conjungated diolefin and 0.5–4.0 parts of an unsaturated acid by emulsion polymerization in an aqueous medium that has a pH of from 1.5 to 3.2, said polymerization being carried out in the presence of 0.5–6.0 parts of ortho-phosphoric acid.

2. A method according to claim 1, wherein said vinyl aryl monomer is styrene, said diolefin is butadiene and said unsaturated acid is a member selected from the group consisting of itaconic acid, acrylic acid, and fumaric acid.

3. A method according to claim 2, wherein said unsaturated acid is itaconic acid.

4. A method according to claim 2, wherein said unsaturated acid is acrylic acid.

5. A method according to claim 2, wherein said unsaturated acid is fumaric acid.

6. A method of making a synthetic latex comprising emulsion polymerizing 60–70 parts of styrene, 40–30 parts of butadiene and 1.0–2.0 parts of itaconic acid in an aqueous medium that has a pH of from 1.5 to 3.2 in the presence of 2–4 parts of ortho-phosphoric acid.

7. A synthetic latex comprising 50–80 parts of a vinyl aryl monomer, 50–20 parts of an aliphatic conjugated diolefin, 0.5–4.0 parts of an unsaturated acid and 0.5–6.0 parts by weight of ortho-phosphoric acid, said latex having been prepared by polymerizing said vinyl aryl monomer, said aliphatic conjugated diolefin, and said unsaturated acid in the presence of said ortho-phosphoric acid at a pH of from 1.5 to 3.2.

8. A synthetic latex comprising 60–70 parts of styrene, 40–30 parts of butadiene, 1.0–2.0 parts of itaconic acid, and 2–4 parts of ortho-phosphoric acid, said latex having been prepared by polymerizing said styrene, said butadiene, and said itaconic acid in the presence of said ortho-phosphoric acid at a pH of from 1.5 to 3.2.

References Cited by the Examiner

UNITED STATES PATENTS

| | | | |
|---|---|---|---|
| 2,589,919 | 3/1952 | Arundale et al. | 260—29.7 |
| 2,698,318 | 12/1954 | Brown | 260—80.7 |
| 2,858,281 | 10/1958 | Bauman et al. | 260—879 |
| 2,859,201 | 11/1958 | Uraneck et al. | 260—879 |

MURRAY TILLMAN, *Primary Examiner.*

J. ZIEGLER, *Assistant Examiner.*